US008028166B2

(12) United States Patent
Thibadeau

(10) Patent No.: US 8,028,166 B2
(45) Date of Patent: Sep. 27, 2011

(54) VERSATILE SECURE AND NON-SECURE MESSAGING

(75) Inventor: Robert H. Thibadeau, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 1555 days.

(21) Appl. No.: 11/410,453

(22) Filed: Apr. 25, 2006

(65) Prior Publication Data

US 2007/0250710 A1    Oct. 25, 2007

(51) Int. Cl.
*H04L 9/32* (2006.01)
*G06F 12/14* (2006.01)

(52) U.S. Cl. ........... 713/168; 713/153; 726/2; 726/5; 726/17

(58) Field of Classification Search .................. None
See application file for complete search history.

(56) References Cited

U.S. PATENT DOCUMENTS

| | | | |
|---|---|---|---|
| 3,576,544 A | 4/1971 | Cordero, Jr. et al. | 340/172.5 |
| 3,890,601 A | 6/1975 | Pietrolewicz | 340/172.5 |
| 4,183,085 A | 1/1980 | Roberts et al. | 364/200 |
| 4,442,484 A | 4/1984 | Childs, Jr. et al. | 364/200 |
| 4,593,384 A | 6/1986 | Kleijne | |
| 5,012,514 A | 4/1991 | Renton | 380/4 |
| 5,022,077 A | 6/1991 | Bealkowski et al. | 380/4 |
| 5,027,401 A | 6/1991 | Soltesz | 380/54 |
| 5,101,374 A | 3/1992 | Sinutko, Jr. | 395/725 |
| 5,164,988 A | 11/1992 | Matyas et al. | |
| 5,345,590 A | 9/1994 | Ault et al. | 395/650 |
| 5,394,469 A | 2/1995 | Nagel et al. | 380/4 |
| 5,432,939 A | 7/1995 | Blackledge et al. | 395/700 |
| 5,448,045 A | 9/1995 | Clark | 235/382 |
| 5,504,814 A | 4/1996 | Miyahara | 713/200 |
| 5,600,805 A | 2/1997 | Fredericks et al. | 395/825 |
| 5,623,637 A | 4/1997 | Jones et al. | 395/491 |
| 5,754,821 A | 5/1998 | Cripe et al. | 395/491 |
| 5,787,498 A | 7/1998 | Lee et al. | |
| 5,809,546 A | 9/1998 | Greenstein et al. | 711/164 |
| 5,889,941 A | 3/1999 | Tushie et al. | |
| 5,892,899 A | 4/1999 | Aucsmith et al. | 395/186 |
| 5,892,902 A | 4/1999 | Clark | 395/187.01 |
| 5,928,364 A | 7/1999 | Yamamoto | 713/202 |
| 5,940,513 A | 8/1999 | Aucsmith et al. | 380/25 |

(Continued)

FOREIGN PATENT DOCUMENTS

CN    1567362 A    1/2005

(Continued)

OTHER PUBLICATIONS

"TCPA Security and Internet Business: Vital Issues for IT", The Trusted Computing Platform Alliance, Aug. 2000, pp. 1-11.

(Continued)

*Primary Examiner* — Kaveh Abrishamkar
(74) *Attorney, Agent, or Firm* — Kirk A. Cesari

(57) ABSTRACT

A messaging system and method are associated with a first device. The messaging system includes a plurality of credentials and a plurality of authorities. Each authority associates at least one of a plurality of protocol operations with at least one of the plurality of credentials. The messaging system is adapted to receive an initiating message from a second device, which identifies at least one of the authorities, and responsively implements a security protocol for further messages between the first and second devices in accordance with the identified authority.

23 Claims, 5 Drawing Sheets

U.S. PATENT DOCUMENTS

| | | | |
|---|---|---|---|
| 5,949,601 A | 9/1999 | Braithwaite et al. | 360/60 |
| 6,000,023 A | 12/1999 | Jeon | 711/173 |
| 6,044,349 A | 3/2000 | Tolopka et al. | 705/1 |
| 6,061,449 A | 5/2000 | Candelore et al. | |
| 6,088,802 A | 7/2000 | Bialick et al. | |
| 6,092,202 A | 7/2000 | Veil et al. | 713/201 |
| 6,134,662 A | 10/2000 | Levy et al. | 713/200 |
| 6,138,239 A | 10/2000 | Veil | 713/200 |
| 6,141,752 A | 10/2000 | Dancs et al. | 713/172 |
| 6,157,984 A | 12/2000 | Fisher et al. | 711/112 |
| 6,173,282 B1 | 1/2001 | McCaughan et al. | |
| 6,173,402 B1 | 1/2001 | Chapman | 713/182 |
| 6,175,924 B1 | 1/2001 | Arnold | 713/189 |
| 6,182,222 B1 | 1/2001 | Oparaji | 713/206 |
| 6,192,472 B1 | 2/2001 | Garay et al. | 713/165 |
| 6,219,726 B1 | 4/2001 | Ripberger | 710/36 |
| 6,219,771 B1 | 4/2001 | Kikuchi et al. | 711/164 |
| 6,226,744 B1 | 5/2001 | Murphy et al. | |
| 6,253,281 B1 | 6/2001 | Hall | 711/112 |
| 6,268,789 B1 | 7/2001 | Diamant et al. | 340/5.74 |
| 6,269,409 B1 | 7/2001 | Solomon | 709/329 |
| 6,321,358 B1 | 11/2001 | Anderson | 714/763 |
| 6,324,627 B1 | 11/2001 | Kricheff et al. | 711/163 |
| 6,330,653 B1 | 12/2001 | Murray et al. | 711/173 |
| 6,336,187 B1 | 1/2002 | Kern et al. | 713/161 |
| 6,360,945 B1 | 3/2002 | Drew | 235/382 |
| 6,421,779 B1 | 7/2002 | Kuroda et al. | |
| 6,438,690 B1 | 8/2002 | Patel et al. | |
| 6,446,209 B2 | 9/2002 | Kern et al. | 713/193 |
| 6,468,160 B2 | 10/2002 | Eliott | |
| 6,647,481 B1 | 11/2003 | Luu et al. | 711/206 |
| 6,650,492 B2 | 11/2003 | Lenny et al. | 360/31 |
| 6,691,198 B1 | 2/2004 | Hamlin | 710/305 |
| 6,691,226 B1 | 2/2004 | Frank, Jr. et al. | 713/100 |
| 6,707,548 B2 | 3/2004 | Kreimer et al. | |
| 6,711,605 B2 | 3/2004 | Sekiguchi et al. | 709/1 |
| 6,715,073 B1 | 3/2004 | An et al. | |
| 6,820,063 B1 | 11/2004 | England et al. | |
| 6,836,853 B1 | 12/2004 | Dover et al. | |
| 6,854,039 B1 | 2/2005 | Strongm et al. | 711/163 |
| 6,871,278 B1 | 3/2005 | Sciupac | |
| 6,889,329 B1 | 5/2005 | DiGiorgio et al. | |
| 6,892,383 B1 | 5/2005 | Arndt | 718/1 |
| 6,915,402 B2 | 7/2005 | Wilson et al. | |
| 6,957,364 B2 | 10/2005 | Shimooka et al. | 714/25 |
| 6,986,052 B1 | 1/2006 | Mittal | |
| 7,036,020 B2 | 4/2006 | Thibadeau | |
| 7,046,805 B2 | 5/2006 | Fitzhardinge et al. | |
| 7,085,931 B1 | 8/2006 | Smith et al. | |
| 7,114,051 B2 | 9/2006 | Guu et al. | |
| 7,124,301 B1 | 10/2006 | Uchida | |
| 7,155,616 B1 | 12/2006 | Hamlin | |
| 7,178,034 B2 | 2/2007 | Cihula et al. | |
| 7,228,243 B2 | 6/2007 | Brenner | |
| 7,336,789 B1 | 2/2008 | Mooij et al. | |
| 7,356,665 B2 | 4/2008 | Rawson, III | |
| 7,426,747 B2 | 9/2008 | Thibadeau | |
| 7,461,270 B2 | 12/2008 | Thibadeau | |
| 7,539,890 B2 | 5/2009 | Thibadeau | |
| 7,600,129 B2 * | 10/2009 | Libin et al. | 713/185 |
| 2001/0052073 A1 | 12/2001 | Kern et al. | |
| 2002/0069169 A1 | 6/2002 | Sukeda et al. | |
| 2002/0077177 A1 | 6/2002 | Elliott | 463/40 |
| 2002/0108051 A1 | 8/2002 | Fougeroux et al. | |
| 2002/0136406 A1 | 9/2002 | Fitzhardinge et al. | 380/210 |
| 2002/0157010 A1 | 10/2002 | Dayan et al. | 713/191 |
| 2002/0178337 A1 | 11/2002 | Wilson et al. | 711/173 |
| 2003/0023867 A1 | 1/2003 | Thibadeau | 713/200 |
| 2003/0046472 A1 | 3/2003 | Morrow | |
| 2003/0084168 A1* | 5/2003 | Erickson et al. | 709/229 |
| 2003/0225960 A1 | 12/2003 | Guu et al. | 711/103 |
| 2004/0073795 A1 | 4/2004 | Jablon | 713/171 |
| 2004/0088513 A1 | 5/2004 | Biessener et al. | 711/173 |
| 2004/0128500 A1 | 7/2004 | Cihula et al. | |
| 2005/0066191 A1 | 3/2005 | Thibadeau | 713/200 |
| 2005/0160151 A1 | 7/2005 | Rawson, III | 709/213 |
| 2005/0177698 A1 | 8/2005 | Ku et al. | |
| 2005/0177714 A1 | 8/2005 | Jeong et al. | 713/155 |
| 2005/0197859 A1 | 9/2005 | Wilson et al. | |
| 2005/0210266 A1 | 9/2005 | Cottrell et al. | 713/185 |
| 2005/0268114 A1 | 12/2005 | Thibadeau | |
| 2006/0069915 A1* | 3/2006 | Koeda | 713/168 |
| 2006/0174352 A1 | 8/2006 | Thibadeau | |
| 2007/0174920 A1 | 7/2007 | Thibadeau | |
| 2007/0250710 A1 | 10/2007 | Thibadeau | |
| 2007/0250734 A1 | 10/2007 | Thibadeau | |
| 2007/0250915 A1 | 10/2007 | Thibadeau | |
| 2008/0215306 A1 | 9/2008 | Lidji et al. | |
| 2009/0235109 A1 | 9/2009 | Thibadeau | |

FOREIGN PATENT DOCUMENTS

| | | |
|---|---|---|
| CN | 1716221 A | 1/2006 |
| EP | 0 965 903 A1 | 12/1999 |
| JP | 2041550 A | 2/1990 |
| JP | 5134863 A2 | 6/1993 |
| JP | 5134895 A | 6/1993 |
| JP | 8115266 A2 | 5/1996 |
| JP | 10097446 A | 4/1998 |
| JP | 2001175354 A | 6/2001 |
| JP | 2002100118 A | 4/2002 |
| JP | 2003091704 A | 3/2003 |
| JP | 2004199410 A | 7/2004 |
| JP | 2004303095 A | 10/2004 |
| JP | 2008287020 A | 11/2008 |
| JP | 2010097445 A | 4/2010 |
| WO | WO 99/59049 | 11/1999 |
| WO | 0013073 A1 | 3/2000 |
| WO | 0180190 A1 | 10/2001 |
| WO | 0195273 A1 | 12/2001 |

OTHER PUBLICATIONS

TC Specification Architecture Overview, Specification Revision 1.2, Apr. 2004.

"Initializing the CryptoMemory® Device for Smart Card Applications, Atmel Crypto Memory® Application Note," Atmel Corporation, 2003, pp. 1-12.

"TCPA PC Specific Implementation Specification," Version 1.00, Booklet, Sep. 9, 2001. pp. 1-70.

Gobioff, H. et al.; "Security for Network Attached Storage Devices," School of Computer Science, Carnegie Mellon University, Oct. 23, 1997. pp. 1-18.

"Trusted Computing Platform Alliance (TCPA)", Main Specification Version 1.1a, Booklet, Nov. 12, 2001, pp. 1-321.

"Intel® Protected Access Architecture," Application Interface Specification Revision 1.0, Booklet, Mar. 2001. pp. 1-128.

Strunk, J.D. et al.; "Self-Security Storage: Protecting Data in Compromised Systems," 4th Symposium on Operating Sytems Design and Implementation, Oct. 2000, pp. 1-15.

Tao et al., W.; "Research on a Dedicated CPU Architecture for Java IC Card," Acta Electronica Sinica, vol. 28, No. 11, Nov. 2000, pp. 77-80, 76. Chinese Inst. Electron, China.

"Public Protection of Software," ACM Transactions on Computer Systems, vol. 5, No. 4, Nov. 1987, pp. 371-393.

Saltzer, Jerome H., "Protection and Control of Information Sharing in Multics," Communications of the ACM, vol. 17, No. 7, Jul. 1974.

Wilkes, M.V.; "Hardware Support for Memory Protection: Capability Implementations,", Digital Equipment Corporation, ACM 1982, pp. 108-116.

Brenner, R.; "Smart Cards with Built-In Microprocessors: Partition into Virtual Cards," Elektronik, vol. 43, No. 9, May 3, 1994 pp. 38-44, Germany.

"SECUR'ACCes: access control with the CP8 smart card", SECURICOM 87, 5th Worldwide Congress on Computer and Communications Security and Protection.SEDEP. 1987, pp. 187-196, Paris, France.

"Memory Protection Software Facility for OS/2 Shared Data Applica-tions", IBM Technical Disclosure Bulletin, pp. 81-89, Sep. 1991.

"Modular System Partition," IBM Technical Disclosure Bulletin, pp. 341-342, Dec. 1992.

"Preventing Access to a Personal Computer," IBM Technical Disclosure Bulletin, pp. 98-100, Sep. 1992.

"Password Protection of Separate Hard Disk Partitions," IMB Technical Disclosure Bulletin, pp. 103-104, Nov. 1996.

"Protection and Control of Information Sharing in Multics" Communications of the ACM, vol. 17, No. 7, Jul. 1974.

Official Search Report of the Australian Patent Office in counterpart application No. SG200703024-0, filed Apr. 24, 2007.

Japanese Office Action dated Sep. 15, 2009 for corresponding Japanese Application No. 2007-114174.

Korean Intellectual Property Tribunal Trial Decision dated Sep. 3, 2010 for corresponding Korean Application No. 10-2007-0040214.

Notice of Allowance dated Jan. 14, 2009 for corresponding U.S. Appl. No. 11/410,447, filed Apr. 25, 2006.

Office Action dated Mar. 4, 2010 for corresponding U.S. Appl. No. 11/410,702, filed Apr. 25, 2006.

Final Office Action dated Aug. 17, 2010 for corresponding U.S. Appl. No. 11/410,702, filed Apr. 25, 2006.

* cited by examiner

VERSATILE SECURE AND NON-SECURE MESSAGING

CROSS REFERENCE TO RELATED APPLICATIONS

Cross-reference is hereby made to U.S. application Ser. No. 11/410,702, entitled "VERSATILE ACCESS CONTROL SYSTEM" and U.S. application Ser. No. 11/410,447, entitled "HYBRID COMPUTER SECURITY CLOCK", which were filed on even date herewith and are hereby incorporated by reference.

Cross-reference is also made to copending U.S. patent application Ser. Nos. 09/912,931, filed Jul. 25, 2001 and entitled "METHODS AND SYSTEMS FOR PROMOTING SECURITY IN A COMPUTER SYSTEM EMPLOYING ATTACHED STORAGE DEVICES"; 10/963,373, filed Oct. 12, 2004 and entitled "SYSTEM AND METHOD FOR DELIVERING VERSATILE SECURITY, DIGITAL RIGHTS MANAGEMENT, AND PRIVACY SERVICES FROM STORAGE CONTROLLERS"; 10/984,368, filed Nov. 9, 2004 and entitled "SYSTEM AND METHOD FOR DELIVERING VERSATILE SECURITY, DIGITAL RIGHTS MANAGEMENT, AND PRIVACY SERVICES"; 11/178,908, filed Jul. 11, 2005 and entitled "METHODS AND SYSTEMS FOR PROMOTING SECURITY IN A COMPUTER SYSTEM EMPLOYING ATTACHED STORAGE DEVICES"; 11/343,338, filed Jan. 31, 2006 and entitled "METHOD AND APPARATUS FOR PROVIDING VERSATILE SERVICES ON STORAGE DEVICES"; and 11/346,118, filed Feb. 2, 2006 and entitled "METHODS AND SYSTEMS FOR PROMOTING SECURITY IN A COMPUTER SYSTEM EMPLOYING ATTACHED STORAGE DEVICES".

FIELD OF THE DISCLOSURE

The present disclosure generally relates to secure and non-secure messaging in communication channels between devices, such as computer systems and communication networks.

BACKGROUND OF THE DISCLOSURE

A problem that arises in secure communications is that a solution or secure messaging protocol may actually involve a selection among competing security protocols. Some secure messaging protocols cost more in computational load, perhaps delivering less security. Other protocols can deliver less security because the channel along which they communicate is itself well-protected. A large number, if not a majority of common messaging protocols exhibit limited versatility in the form of selection among only a handful of alternatives, typically less than a dozen.

Also, the selection among protocols typically requires both ends of the channel to use intelligent mechanisms with Turing Machine power in order to negotiate which protocol is being selected.

Improved systems and methods are therefore desired, which could provide increased versatility and extensibility to many different secure and non-secure messaging protocols and which do not require intelligent mechanisms at both channel ends to negotiate a selected protocol.

Various embodiments of the present invention address these problems, and offer other advantages over the prior art.

SUMMARY

One embodiment of the present invention is directed to a messaging system associated with a first device. The messaging system includes a plurality of credentials and a plurality of authorities. Each authority associates at least one of a plurality of protocol operations with at least one of the plurality of credentials. For example, a protocol operation may include an authentication, key exchange, and/or key agreement operation with additional security context that may also be required by the each authority. The messaging system is adapted to receive an initiating message from a second device, which identifies at least one of the authorities, and responsively implements a security protocol for further messages between the first and second devices in accordance with the identified authority.

Another embodiment of the present invention is directed to a messaging system, which includes a peripheral, a host and a communication channel between the peripheral and the host. The peripheral includes a first table of authorities. Each authority in the first table associates at least one of a plurality of protocol operations with at least one of a plurality of credentials. For example, a protocol operation may include an authentication, key exchange, or key agreement operation with additional security context that may also be required by the each authority. The host includes a second table of authorities. Each authority in the second table associates at least one of the plurality of authentication operations with at least part of the credential associated with that authority in the first table. Messages passed through the communication channel invoke at least one corresponding authority in each table.

Another embodiment of the present invention is directed to a method of initiating a messaging session. The method includes maintaining a plurality of authorities known to a peripheral, wherein each authority associates at least one of a plurality of protocol operations with at least one of a plurality of credentials; passing a start session message from a host to the peripheral, which identifies at least one of the authorities known to the peripheral; retrieving the identified authority from the plurality of authorities known to the peripheral; and implementing a security protocol on further messages between the host and the peripheral in accordance with the identified authority.

Other features and benefits of one or more embodiments of the present invention will be apparent upon reading the following detailed description and review of the associated drawings.

DETAILED DESCRIPTION OF ILLUSTRATIVE EMBODIMENTS

1. Introduction

Figure 1:
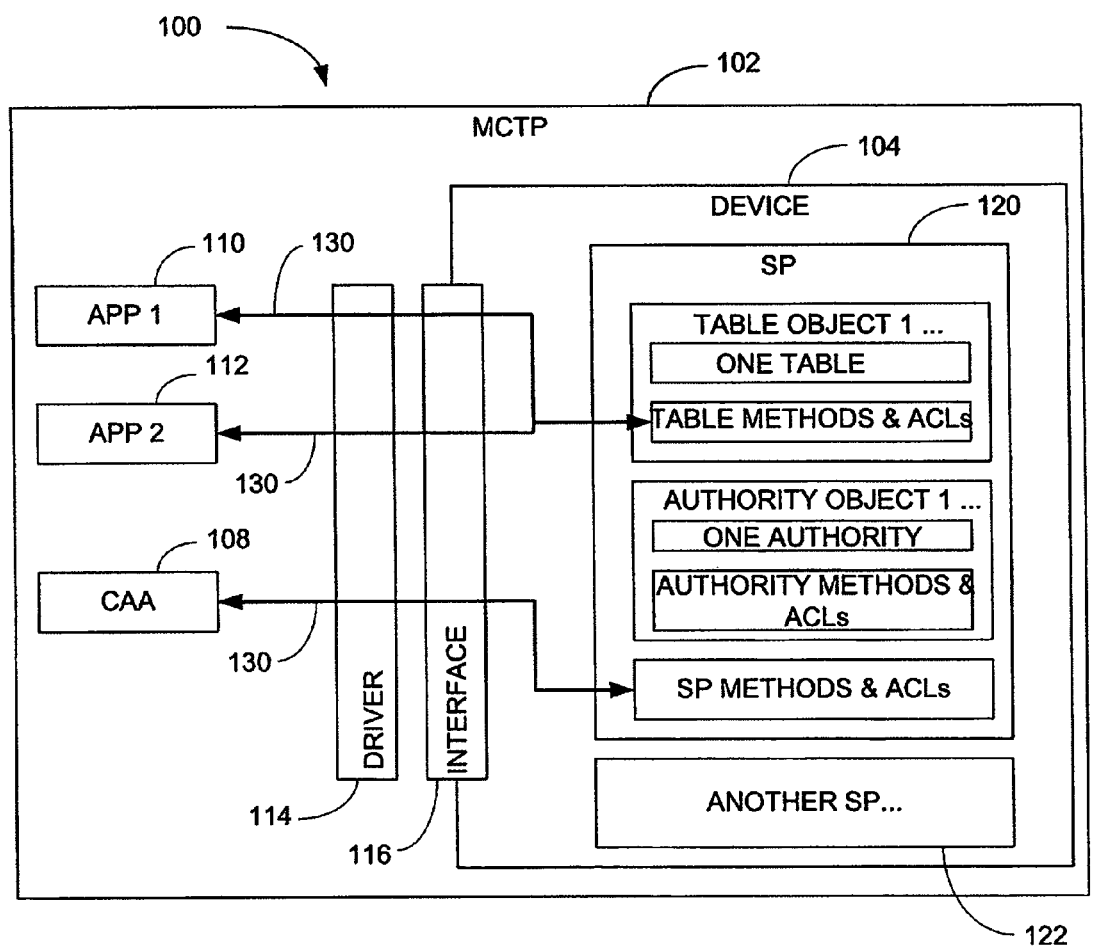
FIG. 1 is a block diagram of a multi-component trusted platform having a trusted peripheral device with a secure/non-secure messaging and access control subsystem according to an embodiment of the present invention.

The present disclosure describes a compact but versatile system and method for providing secure and non-secure messaging in communication channels between devices. Each end of a channel can be programmed to implement an indefinitely large number of different secure and non-secure messaging protocols without either end of the communication channel having to negotiate with the other end or inquire as to its security capabilities. For example, the security protocols are implemented on each end with a set of simple tables without requiring the use of problem solving mechanisms with Turing Machine power.

In one or more embodiments, the selection of protocol in the domain set of available protocols simply emerges from the performance of the protocol itself. So, for example, there may be no "crypto suite" from which to select. There is no "optional" selection required. Every protocol simply starts and finishes.

In one embodiment, the domain set of available protocols includes the family of protocols that establish a communication session with the capability of establishing a secure session (or non-secure session). A session is a communication channel established between two end points (such as a host device and a peripheral device) at the request of one of the end points and ended by termination rules that are outside the scope of this disclosure. Although in an embodiment, either endpoint can terminate a session for any reason after the session is initiated.

As described in more detail below, the present disclosure also relates to the initiation of a session that allows the following session communications to be shielded for confidentiality or not. The session may be a secure session or a non-secure session. A secure session implies the cryptographic use of session keys that encrypt and decrypt the messages. Establishing a secure session can include the exchange of session keys for that session. In one embodiment, the messaging system uses two session keys, one for each direction through the communication channel.

A further aspect of the messaging system and method, whether secure messaging is used or not, is the authentication of the parties to the session, the agreement as to the keys to be used to insure confidentiality during the session, and any further session security requirements. Sometimes it is important for one or the other party to prove its authenticity to the other party. There are different means of proving authenticity. The present disclosure describes a versatile messaging system and method that are capable of providing the largest possible gamut of authentication operations, if desired, as well as the largest possible gamut of key exchange or agreement, if desired. In this case, a particular messaging protocol can be executed to suit the particular requirements of the software applications that are communicating.

To accomplish this, the messaging system and method use the construct of an "Authority". This construct is one possible embodiment and extension of the tabular "Authority" mechanism described in U.S. Patent Application Publication US2003/0023867, published Jan. 30, 2003. In the present disclosure, an Authority identifies a particular proof of knowledge Credential (such as an RSA public key credential), a particular use of that credential (an Authentication Operation such as "Signing"), and any specific Response Authorities (such as "ResponseSigning" and "ResponseExchange" as described below). Each end of the communication channel has knowledge of at least part of the information managed by the Authorities defined at the other end.

For purposes of description, the following disclosure distinguishes between the two parties to the session as the "Host" device and the "Peripheral" device, which is only to distinguish that the Host device is the first to solicit the session. For example, the Host device and the Peripheral device can each include any computing device or peripheral of a computing device, such as but not limited to, desktop computer systems, laptop computer systems, networked computer systems, wireless systems such as cellular phones and PDA's, digital cameras including self-contained web-cams, storage devices, and/or any reasonable combination of these or other systems and devices.

In one or more embodiments, the messaging system and method are embedded within the firmware of a peripheral device being accessed, such as within a graphics controller or a storage device controller. The system and method are embedded as a feature or resource inside the peripheral device controller. The system and method provide a mechanism that allows a user to flexibly define authentication and messaging protocols using many different kinds of Authorities by implementing the authentication and messaging process through a series of simple tables, for example, that can be easily defined or programmed for a particular application.

The Host and the Peripheral maintain similar tables and have at least some knowledge of each Authority and credentials maintained by the other device. The Host initiates a session with the Peripheral by issuing a StartSession command that identifies a desired Authority known by both the Host and the Peripheral. That Authority associates a corresponding Credential with a respective Authentication Operation and any respective ResponseSigning Authority and/or ResponseExchange Authority, which determine the security protocols for future communications between the Peripheral and the Host during that session. These Authorities identify the type and encryption of any key exchanges (or key agreements) between the Host and the Peripheral. The content and meaning of the table entries may be different for different types of devices with different features and capabilities. The system and method can also control access to creating and deleting tables, and reading and writing table entries.

An Authority may also contain other security context requirements, such as a requirement for a signed cryptographic hash to insure the integrity of the session commands, a certificate chain proving acceptability of a particular public key or a requirement that a certificate be otherwise checked for certain validity conditions.

The Credential tables include a plurality of proof of knowledge credentials that can be proven by a respective proof of knowledge operation, known as a Protocol Method or Protocol Operation. An Authority table defines a plurality of Authorities and for each Authority, associates at least one of the proof of knowledge operations (Protocol Operations) with at least one of the proof of knowledge Credentials.

Before describing the process of initiating a communication session and use of the Authority and Credential Tables, the following sections describe the tables in greater detail according to an embodiment of the present invention.

2. Tables 2.1 Security Provider—Collection of Tables

One or more Security Providers (SPs) are generated for each peripheral device with which communication or access is desired. An SP includes, for example, an atomic collection of access control Tables and Methods that can be issued in a peripheral device on behalf of a host software provider. A host software provider includes any device or process, such as a software application, that is directly or indirectly coupled to the peripheral device and desires to communicate with and/or access a resource or feature on or associated with the peripheral device.

Access Control limits who or what can execute methods on a Security Provider, an access control table, or even on specific rows and columns of a table. The term "Method" is used herein to refer to the actions that the host application desires to perform that makes use of a resource or feature of the peripheral device and to which one or more authorities are attached. For example, Method calls to an SP can include a Get (get a value), a Set (set a value), Unlock (e.g. unlock a serial port), etc. These Methods can be directed to actions on an access control table maintained by the SP and actions on other peripheral resources governed by the SP, such as actions on data storage media. SPs may be issued and deleted.

Permission to execute a Method is governed by which secrets the invoker has proven that it knows. The secrets and their public parts are called Credentials. As mentioned above, the operation for proving knowledge of a secret is called an Protocol Operation. The actual proving of knowledge of a secret is called Authentication, Key Exchange, or Key Agreement.

In one embodiment, for example, the access control tables are the only persistent state for an SP. That is, the only data for an SP that persists past the end of a session is the data that is stored in the tables. The tables survive peripheral device reboots and operations on the non-secure areas of the device.

The access control tables can be stored (in whole or in part) in any physical memory device that is associated with the peripheral device. For example, the tables can be stored in SP-specific parts of a secure storage area of the device.

2.2 General Description of Tables

A table includes a grid with named columns and addressable rows. At each column and row intersection there is a cell. All the cells in a column have the same type. A table's size may be determined when it is created, as the types of the columns and the maximum number of rows may be fully specified. However, the term "table" as used in the specification and claims can include any data structure or arrangement that can be used to associate two or more fields of data in memory. The "rows" and "columns" of the table refer to the manner in which the fields are associated with one another, not necessarily the physical arrangement of memory cells in which the fields are stored and these two terms are interchangeable.

By way of example only, the names used herein include of ASCII characters, the first of which is be a letter and others being a letter, digit or underscore.

Within a Security Provider, tables may be created and deleted. For each table, rows may be created and deleted (except within a Byte table—see below), but columns are created only when the table is created, for example.

Each Security Provider can have a set of metadata tables that completely describes all the tables of the SP including the metadata tables themselves.

2.3 Kinds of Tables

In one exemplary embodiment, there are four kinds of tables:

A Byte Table has one unnamed column of type uinteger{1}, for example, which is a one byte unsigned integer. This provides a raw storage abstraction.

An Array Table has rows that are addressed by an unsigned integer of type uinteger{4}, which, for example, is a four byte unsigned integer. The first row is 1, etc.

An Indexed Table has one or more columns designated as the index. Each row of the table has a unique and distinct index (has unique and distinct values in all indexed columns). The index is the only way to address a row, for example.

An Object Table is a kind of Indexed Table. An Object Table has a Name column. Its index is a single column with name "Name" and type bytes{max=18}, for example. This is the name of the object and provides a fast way to find an object with a specified object type and name. An Object Table has columns for storing row (object)-specific Authorities.

Except for Byte tables:

a newly created table is initially empty and rows must be created before it can be used;

there is an ID column of type uinteger{4}. Each row has a unique value in this column that is never shared with another row, and is never reused. New values are assigned when rows are created and old values are discarded when rows are deleted. The ID column may be an index column in an indexed (or object) table. The ID column is present to provide anti-spoofing capability.

2.4 Authority Table and Credential Tables

The following sections define an Authority Table and several Credential Tables used in one embodiment of the present invention for implementing a versatile secure and non-secure messaging system and method. Additional tables and other table formats can be used in alternative embodiments. These tables are provided as examples only. In the following tables, unique ID references (UIDREF) are used in all table-to-table links in order to prevent one object from being mistaken for another.

2.4.1 Authority Table (Object Table)

Table 1 provides a description of the columns in each row of the Authority Table, according to one embodiment of the present invention.

TABLE 1

AUTHORITY Table Description

| Column | Type | Description |
| --- | --- | --- |
| ID | uid | Unique identifier of authority object. |
| Name | name | Name of the authority. |
| CommonName | name | Name common to several authorities |
| IsClass | boolean | If True, this is a Class Authority. If False, this an Individual Authority. |
| Class | uidref{Authority} | Optional. Designates the Class Authority this Authority participates in. |
| Enabled | boolean | If False, Authority is Disabled and Authentication automatically Fails. |
| Secure | boolean | True if authority requires secure messaging. This field is only used in establishing a secure session. |
| HashAndSign | hash_protocl | If not NONE, a signed hashs are to be used either during session creation or with session messaging. |
| PresentCertificate | boolean | If the Authority is a public key authority and if the credential contains a certificate chain, then present the certificate chain along with the authority. |

TABLE 1-continued

AUTHORITY Table Description

| Column | Type | Description |
|---|---|---|
| Operation | authentication_method | What Protocol Operation to perform with the Credential (e.g., Exchange, Signing, SymK, HMAC, PIN, None) |
| CredentialTable | Credential | Which type of Credentials—a C_* table name, like C_RSA1024 selected from the publicly readable CryptoSuite Table in Admin. |
| Credential | uidref{credential} | Which specific Credential to use. |
| ResponseSign | uidref{Authority} | If present (non-zero), a required bilateral condition with another Authority |
| ResponseExch | uidref{Authority} | If present (non-zero), a required bilateral condition with another Authority |
| ClockStart | date | Authority is enabled starting on this date if the Device has a trusted date. No date signifies no start limit. |
| ClockEnd | date | Authority is disabled on this date if the Device has a trusted date. No date signifies no end limit. |
| Log | bytes{1} {LogSuccess = 1, LogFail = 2} | These flags enable logging of different events that occur when this authority is authenticated. Log = 0 is no logging. This logging is only applicable when authentications are done in establishing a session or in augmenting the authorities on it, not when authentication is tested on a method. |

Each row of the Authority table is an Authority. An Authority is a specific use of a Credential, and possibly other Authorities. Authorities come in two types: Individual and Class. An Individual Authority specifies one Credential (secret) and one Authentication Operation (how to prove knowledge of that secret) for that Credential. Each Individual Authority may be a member of a Class Authority. A Class may also be a member of a Class. A Class Authority is identified only by its Class Name and Authority UID, for example. A Class Authority does not refer directly to a Credential.

A Class Authority is authenticated when an Individual Authority that is a member of that Class Authority is authenticated. Class Authorities are not directly authenticated.

In each table the data type uiref{tableName} refers to a unique row of the table named "tableName".

Each row (Authority) of the Authority table has a column named "Credential", which identifies the specific Credential (a unique row of the table "credential", as identified by uiref{Credential}) to use for Authenticating proof of knowledge for this particular Authority. Each row (Authority) also has a column named "Operation", which identifies a particular Protocol Operation (such as Signing or Key Exchange) by which Credential is authorized.

The "Credential Table" column identifies the table name of the particular type of Credentials being used, and the "Credential" column identifies the specific row of the Credential Table that is being used. For example, if a Credential type specifies the particular row (e.g., a particular key) of a C_RSA Credential table.

The Authentication Operation is identified in the "Operation" column, as appropriate, for the Credential. Examples of possible Authentication Operations include:
Password or PIN or Passcode;
Signing:
  Public Key Challenge/Response Sign/Verify
  Symmetric Key Challenge/Response Sign/Verify
  Hash MAC, or HMAC Challenge/Response Sign/Verify;
Key Exchange (Certificates or other methods provide implicit Authentication):
  Public Key Encrypt/Decrypt
  Symmetric Key Encrypt/Decrypt; and None or " " This operation will always Succeed and therefore the Authority will always Authenticate.

The "ResponseSign" and "ResponseExch", if present, identify a bilateral condition with another Authority in the Authority Table. These columns provide a link to another row in the Authority table that defines a further Authority that must be satisfied. The ResponseSign column may point to a Response Signing Authority (a unique row of the table "Authority", as identified by uiref{Authority}) that requires a Public Key Challenge and Response signature. The ResponseExch column may point to a Response Exchange Authority that requires a key exchange between the Peripheral and the Host, such as a Public Key or Symmetric Keys.

2.4.2 Certificate Data Tables (Byte Table)

Table 2 provides a description of the columns of a Certificate Data table, according to one embodiment of the present invention.

TABLE 2

CERTIFICATE DATA Table Description

| Column | Type | Description |
|---|---|---|
| Code | certificate | Bytes of a certificate or trusted certificate chain. May use more than one contiguous row. X.509 as defined by the certificates requirements. |

The Certificate data table stores data that is used for data validating a public key, for example.

Certificates (Object Table)

Table 3 defines the columns of each row of a Certificates table. Each row has a Certificate name and a pointer to the Certificate's byte code.

TABLE 3

CERTIFICATES Table Description

| Column | Type | Description |
|---|---|---|
| ID | uid | ID of Script |
| Name | name | Name of Certificate |
| Code | ref{CertificateData} | Pointer to the certificate's byte code. |

TABLE 3-continued

CERTIFICATES Table Description

| Column | Type | Description |
| --- | --- | --- |
| CodeCount | uinteger{4} | Number of bytes actually used in the certificate. |

2.4.3 Credential Tables (Object Tables)

The following tables provide examples of different types of Credential tables that can be used in one or more embodiments of the present invention. These tables are not exclusive, and additional tables can be included to implement addition types of Credentials. In one embodiment, each Credential table is associated with a corresponding one of a plurality of proof of knowledge operations, called Protocol Operations.

The Credential tables represent an extensible basis for providing the public and private parts of Protocol mechanisms (e.g., Authentication, Key Exchange and/or Key Agreement). Each Credential table represents a different mechanism and each row a different Authority using the mechanism represented by the table.

A particular Credential table need not have all its columns filled in. For example, if only a public key and certificates validating that public key are known, then the private key may be absent. A Credential table may also have internal functions for using the secrets and the public parts of each credential and handle all optional parts.

The Credential tables contain secrets that might never need to leave the peripheral. To help protect against an attack in which the trusted peripheral electronics are changed, the Credential tables can have a Hide column to tell the peripheral to hide the columns that contain secrets on the storage media. For example, the secrets can be Crytographically hidden on the storage media when possible.

2.4.3.1 C_PIN (Object Table)

Table 4 defines the columns of a PIN Credential table according to one embodiment of the present invention.

TABLE 4

C_PIN Table Description

| Column | Type | Description |
| --- | --- | --- |
| ID | uid | Unique identifier of the password. |
| Name | name | Name of the password. |
| PIN | password | Password string. |
| Hide | boolean | Cryptographically hide value on media when possible |
| TryLimit | uinteger{1} | Maximum number of failed tries before always failing. |
| Tries | uinteger{1} = 0 | Current number of failed tries. |

The Credential table PIN, C_PIN, contains one row for each Authority that requires a password. Table 4 provides a definition for each column of the C_PIN table. Each row of the C_PIN table contains a column named "PIN" that stores a password string for a particular Authority. The "HIDE" column can be used to cryptographically hide the password string on the storage media when possible.

The "Tries" column is updated by the peripheral device on every failed Authentication attempt, including the implicit Authentication attempt if the Authority is a Signing Authority invoked during a session startup. The "Tries" column is set to zero by the peripheral device when the Authenticate succeeds.

2.4.3.2 C_RSA_1024 (Object Table)

Table 5 defines the columns of a CRSA_1024 Credential table according to one embodiment of the present invention.

TABLE 5

C_RSA_1024 Table description

| Column | Type | Description |
| --- | --- | --- |
| ID | uid | Unique identifier. |
| Name | name | Name. |
| CryptoCall | name = RSA | Crypto Type |
| CryptoLen | uinteger{2} = 1024 | Length of Key |
| Pu_Exp | uinteger{10} | RSA Public Exponent |
| Pr_Exp | uinteger{10} | RSA Private Exponent |
| Mod | uinteger{10} | Modulus |
| P | uinteger{10} | p and q, the primes from the key generation, |
| Q | uinteger{10} | |
| Dmp1 | uinteger{10} | d mod (p − 1) and d mod (q − 1) (often known as dmp1 and dmq1) |
| Dmq1 | uinteger{10} | (1/q) mod p (often known as iqmp) |
| Hide | boolean | Cryptographically hide value on media when possible |
| ChainLimit | uinteger{1} | The chaining Limit for using a chained down key from this one. −1 indicates no limit. 0, no chain, is the default. |
| Certificate | uidref{Certificate} | Certificate(s)—provides a chained set of unencoded X.509 certificates if needed to prove an ancestor authority |

Table 5 implements an RSA Laboratories public-key cryptosystem having a key length of 1024 bytes. The public exponent and the private exponent columns of the RSA table represent a public-private key pair for each row of the table. Again, the column containing secrets such as the RSA private exponent, modulus, P and Q primes, DMP1 and DMQ1 and IQMP can be hidden on the medium.

2.4.3.3 C_RSA_1048 (Object Table)

Table 68 defines the columns of a C_RSA_2048 Credential table according to one embodiment of the present invention.

TABLE 6

C_RSA_2048 Table Description

| Column | Type | Description |
| --- | --- | --- |
| ID | uid | Unique ID. |
| Name | Name | Name. |
| CryptoCall | name = RSA | Crypto Type |
| CryptoLen | uinteger{2} = 2048 | Key Length |
| Pu_Exp | uinteger{20} | Public Key |
| Pr_Exp | uinteger{20} | Private Key |
| Mod | uinteger{20} | Modulus |
| p | uinteger{10} | p and q, the primes from the key generation, |
| q | uinteger{10} | |
| Dmp1 | uinteger{10} | d mod (p − 1) and d mod (q − 1) (often known as dmp1 and dmq1) |
| Dmq1 | uinteger{10} | (1/q) mod p (often known as iqmp) |
| Hide | boolean | Cryptographically hide value on media when possible |
| ChainLimit | uinteger{1} | The chaining Limit for using a chained down key from this one. −1 indicates no limit. 0, no chain, is the default. |
| Certificate | uidref{Certificate} | Certificate(s)—provides a (possibly chained) set of unencoded X.509 certificates if needed to prove signing from an ancestorauthority |

Table 6 implements an RSA public-key cryptosystem having a key length of 2048 bytes.

2.4.3.4 C_ES_160 (Object Table)

Table 7 defines the columns of a C_EC_160 Credential table according to one embodiment of the present invention.

TABLE 7

C_EC_160 TABLE DESCRIPTION

| Column | Type | Description |
|---|---|---|
| ID | uid | Unique identifier. |
| Name | name | Name. |
| CryptoCall | name = EC | Crypto Type |
| CryptoLen | uinteger{2} = 160 | Key Length |
| Hide | boolean | Cryptographically hide value on media when possible |
| p | uinteger{20} | Modulus |
| r | uinteger{20} | Order of the curve |
| b | uinteger{20} | Curve coefficient (y2 = x3 − 3x + b mod p) |
| x | uinteger{20} | Base point coordinate |
| y | uinteger{20} | Base point coordinate |
| alpha | uinteger{20} | Private key |
| u | uinteger{20} | Public key x-coord: (x,y) · α \| x |
| v | uinteger{20} | Public key y-coord: (x,y) · α \| y |
| ECDSAs | uinteger{20} | Hash Initialization Vector |
| ECDSAc | uinteger{32} | Hash Message Block (PseudoRNG) |
| ECDSAHash | enum{Plus-1x, SHA-1, SHA-256} | Hash for ECDSA |
| MQVHash1 | enum{Plus-1x, SHA-1, SHA-256} | |
| MQVHash2 | enum{Plus-1x, SHA-1, SHA-256} | |
| ChainLimit | uinteger{1} | The chaining Limit for using a chained down key from this one. −1 indicates no limit. 0, no chain, is the default. |
| Certificate | uidref{Certificate} | Certificate(s)—provides a (possibly chained) set of unencoded X.509 certificates if needed to prove signing from an ancestor authority |

Table 7 is an example of a Credential Table for implementing an elliptical curve cryptography.

2.4.3.5 C_AES_128 (Object Table)

Table 8 defines the columns of a C_AES_128 Credential table according to one embodiment of the present invention.

TABLE 8

C_AES_128 Table Description

| Column | Type | Description |
|---|---|---|
| ID | uid | Unique identifier. |
| Name | name | Name |
| CryptoCall | name = AES | Crypto Type |
| CryptoLen | uinteger{2} = 128 | Key Length |
| Key | uinteger{16} | Key |
| Hash | hash_protocol | When hashing is required, this selects the hashing algorithm. |
| Hide | boolean | Cryptographically hide value on media when possible |

Table 8 implements an advanced encryption standard having a 128-byte symmetric key. Again, the key can be cryptographically hidden on the media when possible.

As mentioned above, the access and security control tables, such as the Authority Table, the set of Credential Tables, and other related tables, of each Security Provider of a peripheral device are stored (in whole or in part) in a physical memory device that is associated with or accessible by the peripheral device. The Host includes a similar set of Authority and Credential Tables for the SP's it wishes to access. These tables can be stored in whole or in part in any memory that is associated with or accessible by the Host. The information stored in the Host's Authority Table and Credential Tables, however, might contain only part of the information stored in the SP's Tables. For example the host Credential Table might include only a public part of a public-private key pair. This allows the Host to request the correct Authority Operation and provide a corresponding Credential for review by the SP in the peripheral.

3. Example Implementation of Secure Messaging Between a Host and a Peripheral Device FIG. 1 is a block diagram of an example core architecture 100 for implementing a secure/non-secure messaging and access control system as discussed above according to one embodiment of the present invention. FIG. 1 shows a single platform host or Multicomponent Trusted Platform (MCTP) 102. Host 102 keeps track of the peripheral(s) through a Component Authentication Administrator (CAA) 108. Various host software applications, such as APP1 (labeled 110), APP2 (labeled 112), and CAA (labeled 108), may interact with a trusted peripheral or other device 104 through a driver 114 and a peripheral interface 116. Trusted peripheral 104 includes a security provider (SP) 120, which includes an issued set of tables and methods that control a persistent trust state of the peripheral device.

Security provider SP 120 is a completely self-contained and stand-alone security domain of such tables. Peripheral device 104 may have more than one issued security provider, such as 120 and 122 dedicated to specific applications of host 102.

A security provider includes objects that are each composed of persistent data and methods (or remote procedure calls). In one embodiment, the methods, not the data, are bound to access control lists (ACLs). In the simplest case, there are two types of objects in an SP:

In one embodiment, all trusted peripherals have at most one locking SP that allows manipulation security characteristics of the trust peripheral through its set of tables and access-control methods on the tables. In trusted peripherals that can issue new SPs, an Administrator SP can be used to manage multiple SPs.

Applications on host 102, including CAA 108 can query or change a persistent state by establishing sessions with an SP that execute one or more object methods (connectors 130 in FIG. 1).

Host 102 communicates with SP 120 by opening a session using the interface commands of the particular interface 116. In the simplest case, host 102 is the platform host to which the trusted peripheral is directly attached. In a more general case, host 102 could be some other platform host that communicates with an intermediate platform host, which relays the session stream to trusted peripheral 104 over a network.

Trusted peripheral devices that are capable of issuing new SPs may have SP templates from which the new SPs are created. SP templates define the initial tables and the methods that SPs that are based on them will have when issued. SP templates can combine to extend the functionality of the base SP template.

4. Sessions

In one embodiment of the present invention, all communications between host 102 and an SP on peripheral device 104 occur during a session. A session is started by a host. Normally the host application (such as APP1 in FIG. 1) will end a session when it has finished its communication, but either the SP or the host can abort a session at any time for any reason. For a specific SP there can be any number of read sessions active simultaneously, but only one write session, for example. Read and write sessions are mutually exclusive. The implementation may limit the number of simultaneous read sessions to any SP and/or limit the total number of open sessions available to a peripheral device.

Methods are procedures that operate on tables or SPs, and are called within a session to an SP. The caller passes a list of parameter values to the method and the method returns a list of result values followed by a uinteger status code. Each session to an SP has at least two streams of bytes onto which data is encoded. One stream goes from the host to the SP, and the other comes from the SP to the host.

Method calls, their parameters, and their results are sent and received over session streams. Each stream operates asynchronously from all other streams, for example. Typical host method calls will send all their parameters/data to the SP before trying to read any of the results, but the SP is free to generate results incrementally as it consumes its parameters. The host is similarly free to try to read SP results while sending parameters. The SP implementation decides how synchronous or asynchronous to be, so long as the semantics of the method call(s) are not compromised.

5. Initiating a Session

Starting a session depends upon three independent requirements, for example:

a. The peripheral and the requested SP having sufficient resources;
b. Exchanging symmetric keys if secure messaging is required; and
c. Authenticating requirements (one of the following, for example):
 Host must authenticate to SP;
 SP must authenticate to Host;
 Both of the above; and
 None of the above (No authentication).

The host sets the second and third requirements when it attempts to start the session, as described below.

Sessions are started with either a two or four method exchange:
 (S1) StartSession
 (S2) SyncSession
 (T1) StartTrustedSession (optional)
 (T2) SyncTrustedSession (required if StartTrustedSession is used)

Because of the asynchronous nature of session startup, the responses to the StartSession/StartTrustedSession commands are formatted as a method call back to the host: SyncSession/SyncTrustedSession, respectively.

In one embodiment, the four session startup commands (start session method calls) have the following formats in psuedocode:

(1) StartSession[Host: uinteger, SP: bytes, write: Boolean, HostChallenge:
 challenge, HostExhangeAuthority: ref{Authority},
 HostExchangeCert=certificate, HostSigning Authority:
 ref{Authority}, HostSigningCert: certificate: bytes]
 ⇒
(2) SyncSession[Host: uinteger, Peripheral: uinteger, SPChallenge: challenge]

(3) StartTrustedSession[Host: uinteger, SP: bytes, HostResponse: bytes, HostEncryptsSessionKey: bytes]
 ⇒
(4) SyncTrustedSession[Host: uinteger, Peripheral: uinteger, SPResponse: bytes].

In the above format, each parameter of the method call is identified as "parameter name: data type". Commas separate the parameters. The symbol "⇒" represents a separator between a method call specification and return result specification.

The "Host" parameter is the Host session number. Packets from the Peripheral device to the Host will use this session number. The "SP" parameter specifies the name of the Security Provider (SP) on which the session is to be opened. The "Write" parameter, if false, indicates a red session is requested. No changes to the non-transient tables can be made during a read session. If this parameter is true, then a write session is requested. The default is false.

The "Peripheral" parameter is the Peripheral session number. Packets from the Host to the Peripheral device will use this session number. This is "0", for example, if no session could be created.

The Host application starting the session determines the secure messaging and authentication requirements to be satisfied by specifying up to four Authorities, which are known to the Security Provider (SP) on the peripheral:

HostExchangeAuthority(HE): Host's Exchange Key—an implicit authentication, which identifies a HE Authority on the SP from the credential of which the SP generates a session key that is sent to the host for use in further communications;
HostSigningAuthority: Host's Signing Key—used for authenticating the host to the SP;
SPExchangeAuthority SP's Exchange Key—and implicit authentication, which identifies an SP Authority on the host from the credential of which the host generates a session key that is sent to the SP for use in further communications); and
SPSigningAuthority: SP's Signing Key—used for authenticating the SP to the host.

The first two Authorities, HostExchangeAuthority and HostSigningAuthority, if used, are passed in the StartSession method call. These Host Authorities specify particular rows of the Authority table (Table 1 above). The SP Authorities are bilateral authorities called out in the specified row (i.e., the ResponseExch and ResponseSign columns in Table 1 above) of Authority table in the SP of the peripheral device.

The ability to specify authorities in the StartSession method call, coupled with the linking of authorities in the Authority table, provides a large and diverse set of possible session protocols, including secure messaging. It is the initial selection of authorities by the host that determines which protocol is to be followed. Note: when the host makes the StartSession method call it knows which SPExchangeAuthority and SPSigningAuthority (if any) the SP will use from the referenced Authority (referenced row) in the SP Authority table. Those may be the root authorities in a certificate chain whose ultimate effective authority the host does not know. This is why the SP may return certificates to the host as part of SyncSession.

If a HostSigningAuthority or SPSigningAuthority requires a Challenge-Response, as is the case for all PuK, SymK, and HMAC authorities, or if secure messaging is to be used (or both), then the StartSession and SyncSession method calls (S1 and S2) will be followed immediately by the StartTrustedSession and SyncTrustedSession method calls (T1 and T2).

An authority (HostExchangeAuthority, SPExchangeAuthority, HostSigningAuthority, or SPSigningAuthority) that is also a Public Key Authority (an Authority with public key credentials—PuK) may have additional information supplied for it in the form of a Certificate or Certificate chain. In this case the Effective Authority (the one responding to the challenge) will be the tail PuK of that chain. The effective authority is transient to the session. An effective authority transmitted to the SP, the full contents of its certificate chain, will be available only during the session. In one embodiment, it is necessary to create a new authority on the SP (in a write session) if the host wants that authority to persist past on the SP.

Seven examples from among the many possible ways to start a session include:

a. None. No Authorities are used. This is a non-authenticated, non-secure messaging session. No Authorities are called out by the Host in the StartSession command. Any built-in "Anybody" Authority and other Authorities that are created with no credentials will be satisfied (authenticated) in this and all other sessions.
b. Host-PIN. This is the rudimentary case of passcode authentication that is passed in the clear across the channel. Secure messaging is not an option in this case.
c. SP-SymK-Exch. The simplest case that provides for full Host & SP session key encryption. The SP needs to perform only symmetric encryption.
d. Full-PuK. This uses public keys for signing and key exchange, for both the Host application and the SP. With a proper certificate chain or other validation proof for the exchange key, this is also authenticated. SP Issuance is an example where Full-PuK is used.
e. Full-SymK. This uses SymK keys for signing and key exchange, for both the Host application and the SP.
f. Host-PuK-Authentication. This is a simple strong enabler that does not start up secure messaging. An example use case might be an SP embedded in a disk drive controller that authenticates a session in order to unlock the Read/Write functions of a disk drive and, because of the nonce and the private key, does not need a secure channel.
g. Host-PuK-SP-SymK. This is a case where it is desired that the SP sign, but that public key signing, and indeed all private key operations of public key cryptography, are deemed too computationally expensive for the SP. The Host application is allowed to PuK sign and the SP to PuK verify and PuK encrypt a session key. But the SP only SymK signs, and does SymK session key receipt.

Table 9 illustrates an example of the commands and parameters that are called out for various security protocols. In the table, an empty cell means that the authority in question is not called out as a parameter.

TABLE 9

| | | Session Start (S1 & 2) and StartTrusted (T1 & 2) | | | | | | |
|---|---|---|---|---|---|---|---|---|
| Parameter Passed | CMD | Full-PuK | Full-MAC | Host PIN | None | Drive-PuK-Exch | Host-PuK-Authen | Host-PuK-Drive-MAC |
| HostExchange Authority | S1 | HE | HME | | | | | HE |
| HostSigning Authority | S1 | HS | HMS | HS | | HS* | HS | HS |
| Host Challenge | S1 | HN | HN | HPIN | | | | HN |
| DriveExhange Authority | S2 | SPS | SPME | | | SPE | | SPME |
| DriveSigining Authority | S2 | SPS | SPMS | | | | | SPMS |
| DriveChallenge | S2 | SPN | SPN | | | | SPN | SPN |
| HostResponse | T1 | HS (SN) | HMS (SPN) | | | | HS (SPN) | HS (SPN) |
| HostEncrypt SessionKey | T1 | SPE (HK) | SPME (HK) | | | SPE (HK) | | SPMS (HK) |
| DriveResponse | T2 | SPS (HN) | SPMS (HN) | | | | | SPMS (HN) |
| DriveEncrypt SessionKey | T2 | HE (SPK) | HME (SPK) | | | HK (SPK) | | HE (SPK) |

In Table 2, HN and SPN are nonces. HK is the session key assigned by the Host application to the Peripheral device, and SPK is the session key assigned by the Security Provider (SP) on the Peripheral device to the Host application. Successfully and confidentially passing these two session keys will establish secure messaging until the session terminates.

In one embodiment for secure messaging, the session keys may be 3DES or AES keys, for example. The block size is larger than 16 bytes, so encryption block padding can be on 16 byte blocks with zero byte values, for example. Packets are encrypted with the received session key.

6. Examples of Session Initiation

FIGS. 2-5 are diagrams illustrating the commands and parameters passed between the Host and the Peripheral device to initiate various non-secure and secure messaging sessions. For clarity, only the security-related parameters are shown in the diagrams.

6.1 No Authorities Used

Figure 2:
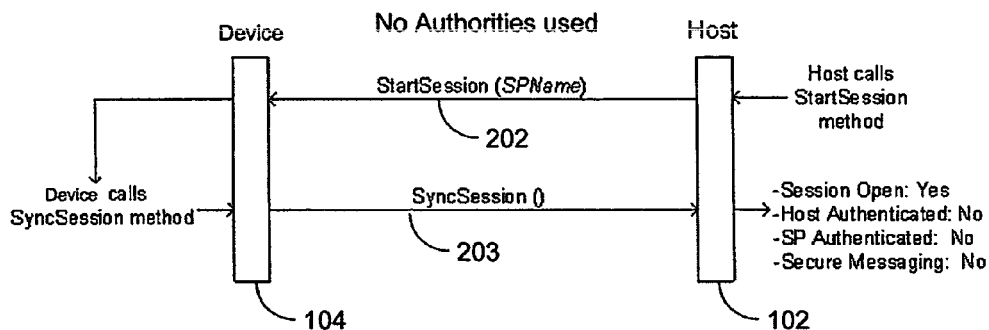
FIG. 2 is a diagram illustrating an example of initiating of a non-authenticated, non-secure messaging session.

FIG. 2 is a diagram illustrating an example of initiating of a non-authenticated, non-secure messaging session.

To initiate the session, the Host 102 calls the StartSession method and passes the SPName parameter to identify the security provider in Peripheral device 104 through which the session will be initiated, as indicated by arrow 202.

The Peripheral device receives the StartSession command, sees that there are no authorities specified and issues a SyncSession method call back, as indicated by arrow 203, to the Host for opening a non-authenticated, non-secure messaging session.

6.2 Passcode (PIN) Authentication

Figure 3:
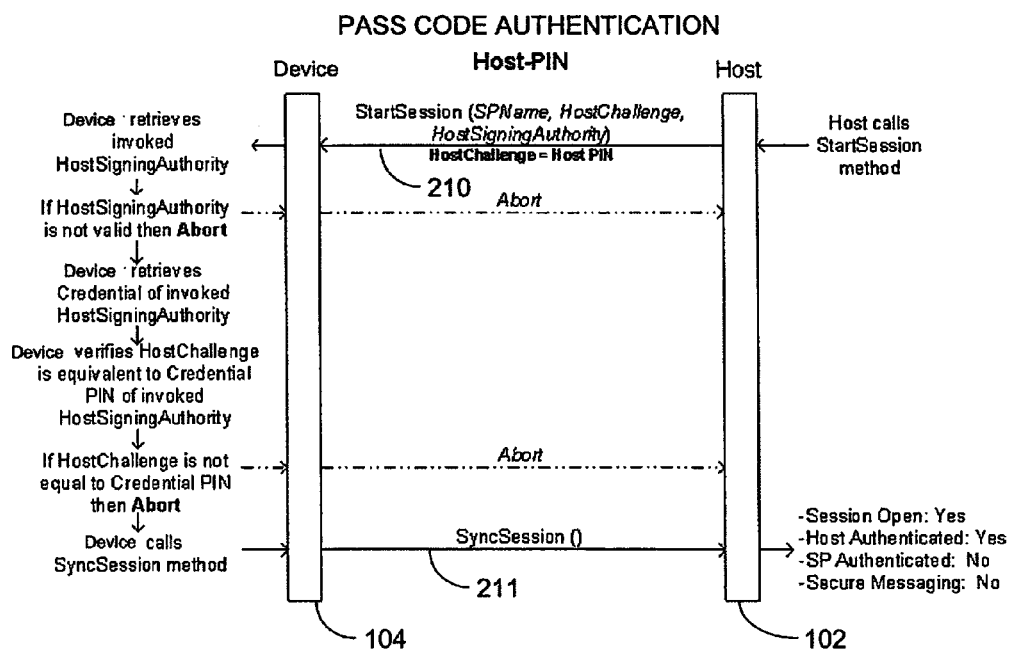
FIG. 3 is a diagram illustrating an example of initiating a messaging session implementing pass code authentication.

FIG. 3 is a diagram illustrating an example of initiating a session implementing pass code authentication between Host 102 and Peripheral device 104. The Host begins communication with Peripheral device 102 by calling a StartSession method, at arrow 210, and passing parameters, including an SPName, a HostChallenge and a HostSigningAuthority.

For example, the HostSigningAuthority may identify Authority number "3" in the Authority table of the named SP, which in this case would correspond to a passcode type of authority. The HostChallege provides the host PIN credential.

Peripheral device 104 invokes the specified HostSigningAuthority (e.g., Authority #3). The specified authority associates a passcode credential with a "passcode" type of Authentication Operation. The passcode credential in the Authority Table points to a particular row in a C_PIN Credential table (e.g., Table 4 above), which stores the corresponding passcode.

If the HostSigningAuthority is not valid (i.e., not in the Authority Table of the named SP), the Peripheral device aborts the session. If valid, the Peripheral device identifies the corresponding passcode the C_PIN Credential table and verifies that the HostChallenge (e.g., PIN) is equivalent to the passcode of the invoked HostSigningAuthority. If not, the peripheral device aborts the session. If so, the peripheral device responds by calling a SyncSession method, at arrow 211, to open the session.

6.3 Full Host & SP Session Key Encryption

Figure 4:
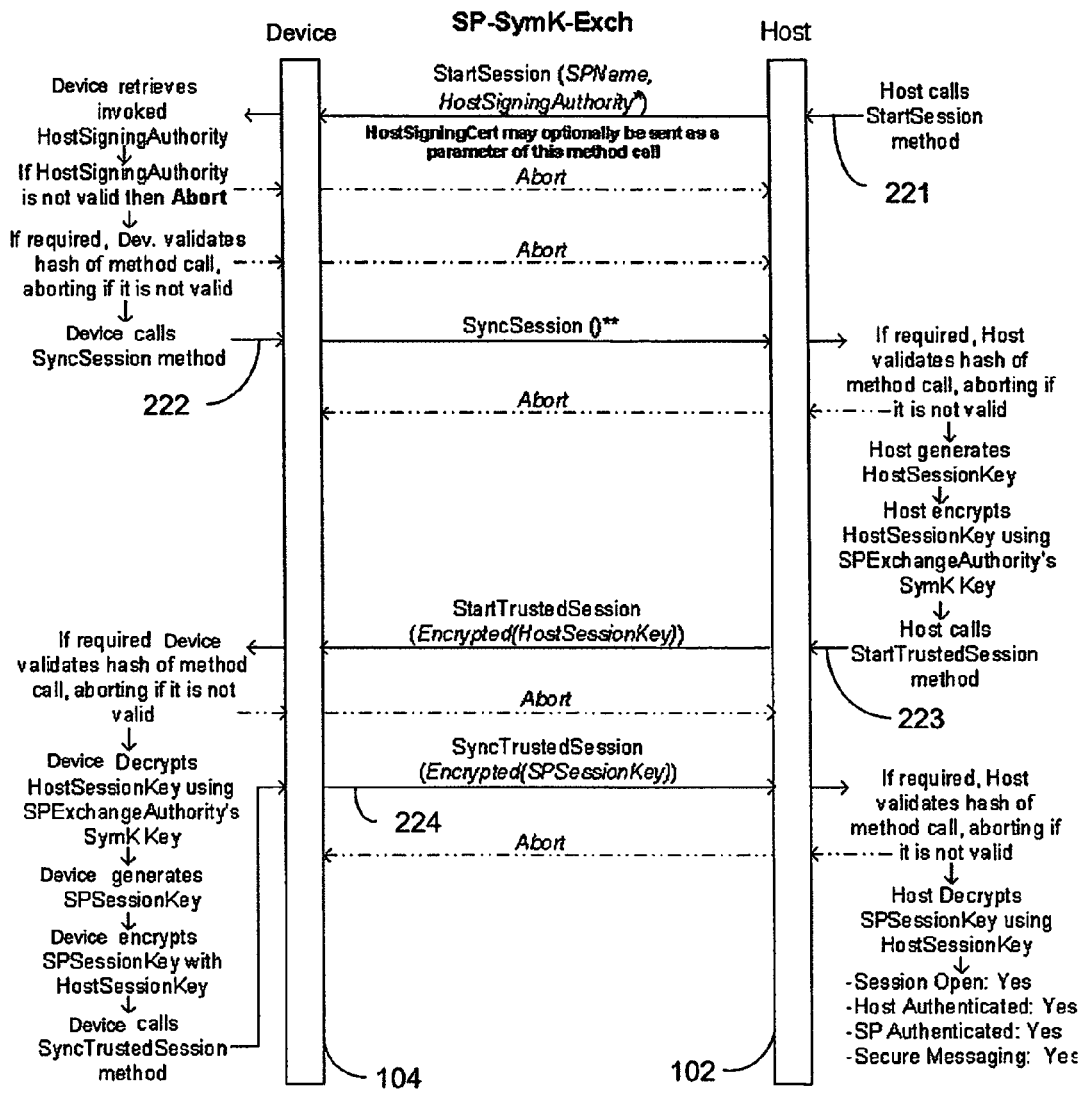
FIG. 4 is a diagram illustrating an example of initiating a session implementing full Host and SP Session Key Encryption.

FIG. 4 is a diagram illustrating an example of initiating a session implementing full Host and SP Session Key Encryption. As indicated by arrow 221, the host begins communication by calling a StartSession method and passing parameters, including an SPName and a HostSigningAuthority. The Host may also optionally send a HostSigningCertificate as a parameter of this method call.

In this example, the specified HostSigningAuthority (e.g., Table 1 above) may have no specified Credential in the credential column of the Authority Table, but has an SPExchangeAuthority specified in the ResponseExch column. The SPExchangeAuthority links to a corresponding SP Exchange Authority in the Authority Table (e.g., Authority number "6").

The Peripheral device retrieves the invoked HostSigningAuthority and if invalid, the Peripheral device aborts the session. If required, the Peripheral device verifies the HostSigningCertificate and method hash and aborts if either are invalid.

If the HostSigningAuthority is valid, the peripheral device responds by calling a SyncSession method to the Host, at arrow 222.

The Host receives the SyncSession method call and generates a HostSessionKey (e.g., a random number) for the peripheral to use in future communications with the Host. The Host then encrypts the HostSessionKey using the SPExchangeAuthority's public key portion of the symmetric key pair identified by the SPExchangeAuthority. Since the Host maintains its own Authority Table, the Host knows that the HostSigningAuthority that it called out in the StartSession links to the SPExchangeAuthority. The Host's corresponding Credential Table has a copy of the SP's public key for that SPExchangeAuthority.

The Host then calls a StartTrustedSession method, at arrow 223, and passes the encrypted HostSessionKey as a parameter to the SP in the Peripheral device. The Peripheral device decrypts the HostSessionKey using the SPExchangeAuthority's private part of the symmetric key, which is stored in the specified row of the corresponding Credential Table.

The Peripheral device then generates an SPSessionKey (e.g., a random number, for the Host to use during future communications with the Peripheral device. The Peripheral device encrypts the SPSessionKey with the HostSessionKey, calls the SyncTrustedSession method, and passes the encrypted SPSesseionKey to the Host, at arrow 224.

The Host decrypts the received SPSessionKey using the HostSessionKey. The session then becomes open, and the Host and Peripheral use each other's session keys to encrypt further messages.

6.4 Host Public Key Authentication

Figure 5:
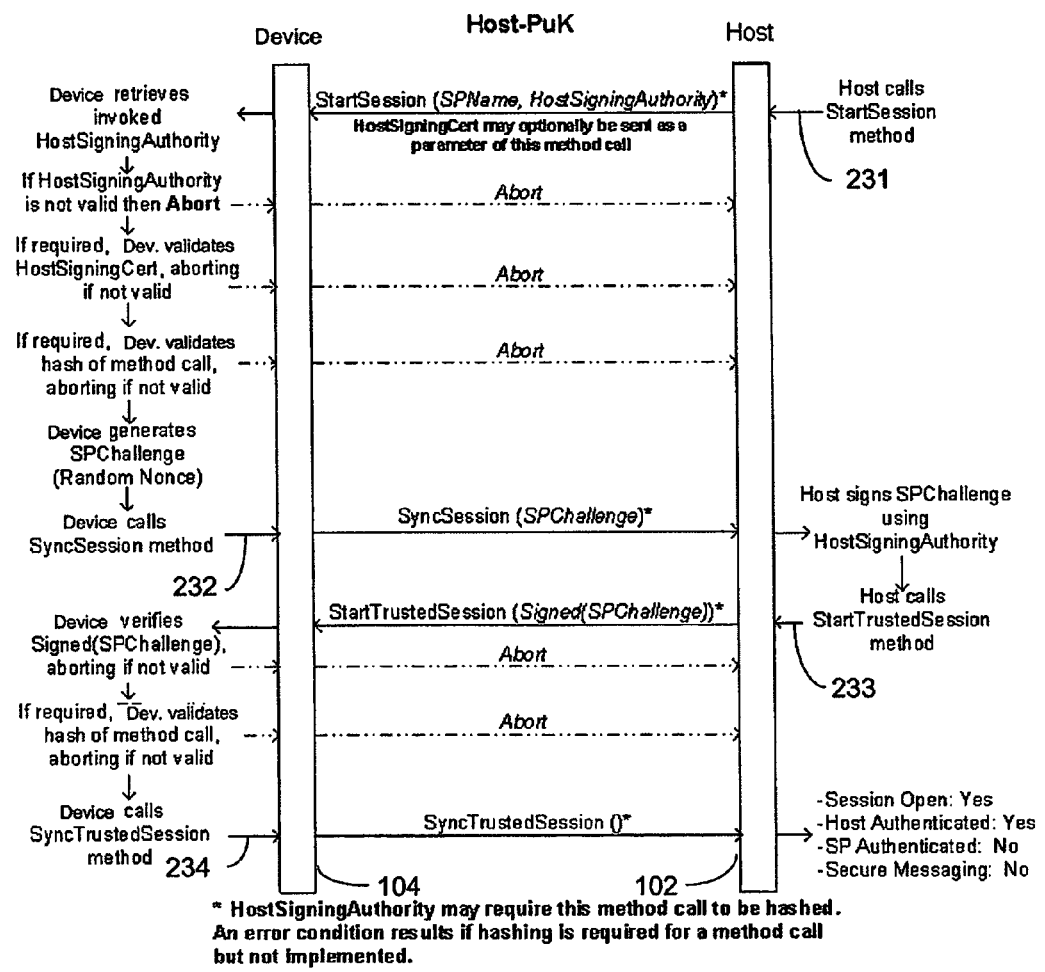
FIG. 5 is a diagram illustrating an example of initiating a session implementing Host Public Key Authentication.

FIG. 5 is a diagram illustrating an example of initiating a session implementing Host Public Key Authentication. As indicated by arrow 231, the host begins communication by calling a StartSession method and passing parameters, including an SPName and a HostSigningAuthority. The Host may also optionally send a HostSigningCertificate as a parameter of this method call.

In this example, the specified HostSigningAuthority (e.g., Table 1 above) in the Authority Table specifies a public key type of Authentication operation and associates this operation with a particular credential (public key) in a corresponding Credential Table. Assuming the HostSigningAuthority and any HostSigningCert and hash are valid, the Peripheral device generates an SPChallenge (e.g., a random nonce) for a public key and passes the SPChallenge to the Host in a SyncSession method call, at arrow 232.

The Host looks in its Authority Table for the specified HostSigningAuthority to identify the Authentication Operation (i.e., public key signing) and the corresponding credential (the Host's private key that is stored in its Credential Table). The Host then "signs" the SPChallenge using the private key credential.

At 233, the Host calls a StartTrustedSession method and passes the signed SPChallenge as a parameter to the Peripheral device.

The Peripheral device verifies the Signed SPChallenge, and aborts the session if not valid. If valid, the Peripheral device calls a SyncTrustedSession method, at 234, to open the session.

Thereafter, the Host has been authenticated. This session does not require that the SP be authenticated to the Host or that secure messaging be used.

6.5 Full Public Key, Full Symmetric Key, and Public/Private Key Authentication

Figure 6:
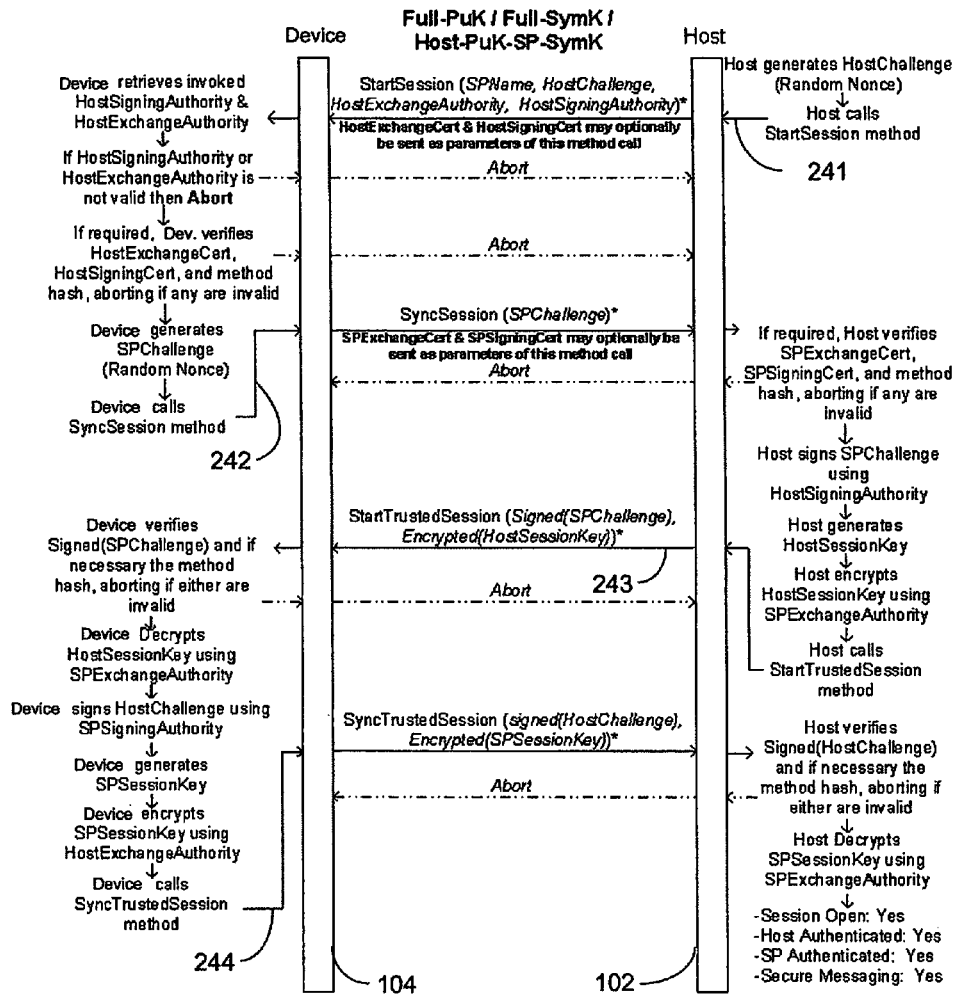
FIG. 6 is a diagram illustrating an example of initiating a session implementing Full Public Key, Full Symmetric Key, and Public/Private Key Authentication.

FIG. 6 is a diagram illustrating an example of initiating a session implementing Full Public Key, Full Symmetric Key, and Public/Private Key Authentication. As indicated by arrow 241, the host begins communication by calling a StartSession method and passing parameters, including an SPName, a HostChallenge, a HostExchangeAuthority and a HostSigningAuthority. The Host may also optionally send a HostExchangeCert and HostSigningCertificate as parameters of this method call.

The Peripheral device retrieves the invoked HostExchangeAuthority and HostSigningAuthority and if either are invalid, the Peripheral device aborts the session. If required, the Peripheral device verifies the HostExchangeCert, HostSigningCertificate and method hash and aborts if any are invalid.

Looking at the invoked HostSigningAuthority, the Peripheral device knows that the HostSigningAuthority requires the Host to authenticate by signing a public key. The Peripheral device generates an SPChallenge (random Nonce), calls a SyncSession method and passes the SPChallenge to the Host for signing, at arrow 242.

The Host looks in its Authority Table for the specified HostSigningAuthority to identify the Authentication Operation (i.e., public key signing) and the corresponding credential (the Host's private key that is stored in its Credential Table). The Host then "signs" the SPChallenge using the Host's private key.

Since the Host knows that it also specified a HostExchangeAuthority in the StartSession method call, the Host generates a HostSessionKey (e.g., a random number) for the Peripheral to use in future communications with the Host. The Host looks in the invoked HostExchangeAuthority's "ResponseExch" column for the identified SPExchangeAuthority and then looks in the identified SPExchangeAuthority's credential column to identify the proper credential in its corresponding Credential Table for the SPExchangeAuthority's public key. The Host then encrypts the HostSessionKey using the SPExchangeAuthority's public key.

The Host then calls a StartTrustedSession method, at arrow 243, and passes the signed SPChallenge and the encrypted HostSessionKey as parameters to the SP in the Peripheral device. The Peripheral device verifies the signed SPChallenge (and method has if necessary) and aborts the session if invalid. If valid, the Peripheral device decrypts the HostSessionKey using the SPExchangeAuthority's private part of the symmetric key, which is stored in the specified row of the corresponding Credential Table.

Peripheral device 104 then signs the HostChallenge (that was provided with the StartSession method call) using the SPSigningAuthority that is specified in the "ResponseSign" column of the invoked HostExchangeAuthority. The SPSigningAuthority has a credential column that identifies the proper credential (e.g., the SP's private key) in its corresponding Credential Table to use when signing the HostChallenge. The Peripheral device also generates an SPSessionKey for the Host to use during future communications with the Peripheral device and encrypts the SPSessionKey using the HostExchangeAuthority. The Peripheral device calls a SyncTrustedSession method and passes the signed SPChallenge and the encrypted SPSessionKey to the Host, at arrow 244.

The Host verifies the signed HostChallenge and if necessary the method has and aborts if either are invalid. The Host decrypts the SPSessionKey using the SPExchangeAuthority. Thereafter, the Host and Peripheral device have each been authenticated to one another, the session is open, and the Host and Peripheral device use each other's session keys to encrypt further messages for secure messaging.

Table 10 illustrates an example of an Authority Table that defines one type of secure messaging filled out. This set of authorities inevitably results in a full four-way authentication with secure messaging. Note that the columns taking on default (null) values are not shown.

each of these authorities are used when initiating a session with the HostSign authority being invoked.

7. Secure Messaging

In the above examples, when secure messaging is used, packets transmitted between the Host and the Peripheral device are encrypted with a symmetric key. Packets from the host to the Peripheral are encrypted with a symmetric key generated by the Peripheral. Packets from the Peripheral to the Host are encrypted with a symmetric key generated by the Host. Secure messaging has the following two advantages.

The first is confidentiality. The content of packets cannot be read by an intruder between the packet source and destination. The second is tamper detection. If hashing is being used, any tampering (including replay attacks) with a packet or stream of packets within a session can be detected. The normal response when tampering is detected is to immediately terminate the session.

In one embodiment, the payload (D) of a packet is encoded by first constructing the following byte sequence (E):
length:uinteger{2}. The number of bytes in D;
D:bytes{length}. The original unencoded data;
hash:bytes{20}. If hashing is selected, the result of applying the
  cyptographic-hash function to the following sequence of bytes:
  seqnum:uinteger{4}. Each packet of a session has a sequence number with the first packet having sequence number 1, the second 2, and so forth. There are separate sequence number sequences for packets going in each direction;
  length:uinteger{2}. The number of bytes in D; and
  D:bytes{length}. The original unencoded data; and
  pad:bytes. This field includes #00 bytes so that the overall length of E is 0
mod 16. The length of the pad will be between 0 and 15.

The encoded result (F) will then include applying symmetric encryption to byte sequence "E" using the destination-generated symmetric key. Cipher block chaining (CBC) can also be used within and also between packets with the initial packet using an all 0 input chain value.

Note that an encoded result "F" may be larger than the payload "D" due to the addition of an optional hash, and possibly extra padding.

Other packet or messaging formats can be used in alternative embodiments. The above format is provided as an example only.

TABLE 10

AUTHORITY TABLE EXAMPLE

| Name | ID | Common Name | Is Class | Class | Secure | Operation | Credential Table | Credential | Response-Sign | Response-Exch | Log |
|---|---|---|---|---|---|---|---|---|---|---|---|
| HostSign | 1 | Protocol A | False | Admins | True | Signing | C_RSA1024 | HostSign | SPSign | SPExch | Fail |
| HostExch | 2 | Protocol A | True | Admins | True | Exchange | C_RSA1024 | HostExch | | | Fail |
| SPSign | 3 | Protocol A | True | Admins | True | Signing | C_RSA1024 | SPSign | HostSign | HostExch | Fail |
| SPExch | 4 | Protocol A | False | Admins | True | Exchange | C_RSA1024 | SPExch | | | Fail |

Note that the HostSign Authority (authority #1 in Table 10) specifies an SPSign Authority (authority #3) in the ResponseSign column and an SPExch Authority (authority #4) in the ResponseExch column. The SPSign Authority (authority #3) specifies the HostSign Authority (authority #1) in the ResponseSign column and a HostExch Authority (authority #2) in the ResponseExch column. Thus, the credentials of

8. Conclusion

The system and method of secure and non-secure messaging described above can initiate virtually any messaging protocol with just two or four commands having a fixed set of parameters. By pre-programming the devices on each end of the communication channel with an Authority Table and corresponding Credential Tables, each device has at least some knowledge of the other device's Authorities. This allows each protocol to simply start and end with each messaging session without having to negotiate security capabilities. The Peripheral device being accessed assumes the Host device knows the Peripheral's authorities. If not, the host cannot access or open a session with the Peripheral.

The messaging system and method are therefore capable of providing a very versatile security protocol. In one example, the number of different protocols available is at least 225 with a minimal set of assumptions, and depending on how the tallying is done, the number is over 1000. Furthermore, the number of available protocols about which properties of security can be proven can easily and effectively be extended to many more than this, such as 10,000 to 100,000. The full number of protocols need not be employed, but the large number of possible protocols gives any user a remarkable breadth in selection. In fact, a particular embodiment might implement only a single or a small number of protocols, if desired, through a small number of table entries.

The messaging system and method can be implemented wholly or partly on any computer-readable media and can comprise one or more instructions or databases that are resident at various times in various memory and storage devices associated with the peripheral device and/or the host. When read and executed by the host or peripheral device the instructions cause the host or device to perform the instructions and/or process the databases or tables embodying the various aspects of the invention. Examples of computer readable media on which such instructions, tables, objects and/or modules can be stored include but are not limited to recordable type media such as volatile and nonvolatile memory devices, floppy and other removable discs, hard disc drives, optical discs, e.g., CD-ROMs, DVDs, etc., among others, and transmission type media such as digital and analog communication links.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the access control system while maintaining substantially the same or similar functionality without departing from the scope and spirit of the present invention. In addition, although the embodiments described herein are directed to a messaging system and method between a host and a peripheral, it will be appreciated by those skilled in the art that the teachings of the present invention can be applied between any two devices, without departing from the scope and spirit of the present invention.

What is claimed is:

1. A first device comprising:
    a plurality of credentials;
    a plurality of authorities, each authority associating at least one of a plurality of protocol operations with at least one of the plurality of credentials; and
    a messaging system adapted to receive from a second device a method call for executing a method on the first device, wherein the method call comprises a parameter having a value that identifies at least one of the plurality of authorities, wherein the value is selected from a set of values, each identifying a respective one of the plurality of authorities, and wherein the messaging system responsively implements a security protocol for further messages between the first and second devices in response to each method call in accordance with the authority identified by the method call.

2. The messaging system of claim 1 wherein the plurality of authorities comprises:
    a signing authority, which defines a credential and a protocol operation by which the one of the first and second devices can authenticate itself to the other of the first and second devices.

3. The messaging system of claim 1 wherein the plurality of authorities comprises:
    an exchange authority, which defines a credential and a protocol operation with which the further messages from one of the first and second devices to the other of the first and second devices are encrypted and decrypted.

4. The messaging system of claim 1 wherein at least one of the plurality of authorities are known to the first device prior to receiving the initiating message.

5. The messaging system of claim 1 wherein at least one of the plurality of authorities, referred to as a first authority, links to another of the plurality of authorities, referred to a second authority, such that both the first and second authorities must be satisfied in response to a method call that identifies the first authority.

6. The messaging system of claim 1 and further comprising:
    an authority table in which the plurality of authorities are stored in respective rows of the table; and
    at least one credential table in which at least one of the plurality of credentials is stored in a row of the credential table.

7. The messaging system of claim 1 and further comprising a credential table for each of the plurality of authentication operations, and wherein the credentials that are associated with a particular one of the plurality of authentication operations are stored in the credential table that corresponds to that authentication operation.

8. A messaging system comprising:
    a peripheral comprising a first table of authorities, which is adapted to store a plurality of distinct authorities, each authority in the first table associating at least one of a plurality of authentication operations with at least one of a plurality of credentials;
    a host comprising a second table of authorities, which is adapted to store a plurality of distinct authorities, each authority in the second table associating at least one of the plurality of authentication operations with at least part of the credential associated with that authority in the first table; and
    a communication channel between the peripheral and the host, wherein messages passed through the communication channel invoke at least one corresponding authority in each table.

9. The messaging system of claim 8 wherein the first and second tables of authorities comprise:
    a signing authority, which defines a credential and a protocol operation by which the one of the peripheral and the host can authenticate itself to the other of the peripheral and the host through the channel.

10. The messaging system of claim 8 wherein the first and second tables of authorities comprise:
    an exchange authority, which defines a credential and a protocol operation with which the messages from one of the peripheral and the host to the other of the peripheral and the host are encrypted and decrypted.

11. The messaging system of claim 8 wherein in each table, at least one of the plurality of authorities links to another of the plurality of authorities in that table.

12. The messaging system of claim 8 wherein the peripheral device and the host device each comprise, for each of the authentication operations:
a corresponding credential table, wherein the credentials that are associated with a particular one of the authentication operations are stored in the corresponding credential table.

13. A method of initiating a messaging session, comprising:
maintaining a plurality of authorities known to a peripheral, wherein each authority associates at least one of a plurality of authentication operations with at least one of a plurality of credentials;
passing a start session message from a host to the peripheral, which identifies at least one of the authorities known to the peripheral;
retrieving the identified authority from the plurality of authorities known to the peripheral; and
implementing a security protocol on further messages between the host and the peripheral in accordance with the identified authority.

14. The method of claim 13 and further comprising:
maintaining a plurality of authorities known to the host, which correspond to the plurality of authorities known to the peripheral, wherein each authority associates at least one of the plurality of authentication operations with at least one of the plurality of credentials, and wherein each credential known to the host comprises at least a portion the corresponding credential known to the peripheral.

15. The method of claim 13 wherein:
retrieving the identified authority comprises exchanging one or more cryptographic keys between the peripheral and the host as a function of the identified authority; and
implementing the security protocol comprises encrypting the further messages using the cryptographic key and the authentication operation of the identified authority.

16. The method of claim 13 wherein:
implementing the security protocol comprises encrypting the further messages at one end of the communication channel using a public key portion of the credential and the associated authentication operation of the identified authority, and decrypting the further messages at another end of the communication channel using a private key portion of that credential.

17. The method of claim 13 wherein implementing the security protocol comprises implementing the security protocol without either the host or the peripheral negotiating security capabilities of the other.

18. The method of claim 13 wherein the plurality of authorities comprises:
a signing authority, which defines a credential and a protocol operation by which the one of the host and the peripheral can authenticate itself to the other.

19. The method of claim 13 wherein the plurality of authorities comprises:
an exchange authority, which defines a credential and a protocol operation with which the further messages from one of the host and the peripheral to the other are encrypted and decrypted.

20. The method of claim 13 wherein the host has knowledge of the authentication operation at least part of the associated credential of the identified authority prior to passing the start session message.

21. The method of claim 13 wherein where at least one of the plurality of authorities links to another of the plurality of authorities.

22. The method of claim 13 and further comprising:
maintaining an authority table in which the plurality of authorities are stored; and
maintaining at least one credential table in which at least one of the plurality of credentials is stored, and linking the authority table to the credential table.

23. The method of claim 22 and further comprising maintaining a credential table for each of the plurality of authentication operations, and wherein the credentials that are associated with a particular one of the plurality of authentication operations are stored in the credential table that corresponds to that authentication operation.

* * * * *